(12) United States Patent
Wilsher et al.

(10) Patent No.: US 9,769,348 B2
(45) Date of Patent: Sep. 19, 2017

(54) APPARATUS AND METHOD FOR OPTIMIZING THE CALIBRATION POSITION FOR DOCUMENT SCANNER CALIBRATION USING A CALIBRATION STRIP

(71) Applicant: Xerox Corporation, Norwalk, CT (US)

(72) Inventors: Michael John Wilsher, Letchworth (GB); Sebastian Rodrigo De Echaniz, Milton Keynes (GB); Paul Simon Golding, Hertford (GB); Benjamin Thomas Thurnell, Cheshunt (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/976,800

(22) Filed: Dec. 21, 2015

(65) Prior Publication Data

US 2017/0180587 A1    Jun. 22, 2017

(51) Int. Cl.
*H04N 1/047* (2006.01)
*H04N 1/00* (2006.01)
*H04N 1/10* (2006.01)

(52) U.S. Cl.
CPC ......... *H04N 1/047* (2013.01); *H04N 1/00013* (2013.01); *H04N 1/00018* (2013.01); *H04N 1/00034* (2013.01); *H04N 1/00037* (2013.01); *H04N 1/00045* (2013.01); *H04N 1/00063* (2013.01); *H04N 1/00087* (2013.01); *H04N 1/1043* (2013.01); *H04N 2201/0006* (2013.01)

(58) Field of Classification Search
USPC ......... 358/1.5, 1.9, 504, 505, 406, 413, 474, 358/481, 497
See application file for complete search history.

(56) References Cited

U.S. PATENT DOCUMENTS

| | | | |
|---|---|---|---|
| 5,091,654 A | 2/1992 | Coy et al. | |
| 7,236,274 B2 | 6/2007 | Sheng et al. | |
| 8,520,272 B1 | 8/2013 | Jowett et al. | |
| 8,559,065 B2 | 10/2013 | Deamer | |
| 9,055,183 B1 * | 6/2015 | Capri | H04N 1/047 |
| 9,270,837 B1 * | 2/2016 | Whitesell | H04N 1/00087 |
| 2007/0235541 A1 * | 10/2007 | Hall | H04N 1/00002 235/454 |
| 2011/0292109 A1 * | 12/2011 | Fosas | B41J 2/04573 347/11 |

(Continued)

*Primary Examiner* — Marcellus Augustin
(74) *Attorney, Agent, or Firm* — Philip E. Blair; Fleit Gibbons Gutman Bongini & Bianco P.L.

(57) ABSTRACT

What is disclosed is an apparatus and method for calibrating an optical module of a document scanning device. In one embodiment, imaging sensors of an optical module of the scanning device are used to obtain an image scan of a calibration strip mounted on a surface of a platen on which a sheet to be scanned has been manually placed. The calibration strip has a first vertical line at a first distance from a right edge of the strip, a second vertical line at a second distance from a left edge of the strip, and a sloping horizontal line positioned between the first and second vertical lines. A slope of the horizontal line is non-zero. In a manner more fully disclosed herein, the image scan of the calibration strip is to obtain calibration measurements. The calibration measurements are, in turn, used to calibrate the scan head of the optical module.

14 Claims, 7 Drawing Sheets

(56) References Cited

U.S. PATENT DOCUMENTS

| | | | |
|---|---|---|---|
| 2012/0019875 A1* | 1/2012 | Hoover | H04N 1/00567 358/474 |
| 2013/0221611 A1 | 8/2013 | Jowett et al. | |
| 2014/0009798 A1 | 1/2014 | Golding et al. | |
| 2015/0138611 A1* | 5/2015 | Golding | H04N 1/00087 358/475 |

* cited by examiner

APPARATUS AND METHOD FOR OPTIMIZING THE CALIBRATION POSITION FOR DOCUMENT SCANNER CALIBRATION USING A CALIBRATION STRIP

TECHNICAL FIELD

The present invention is directed to systems and methods for optimizing the calibration position when calibrating a document scanning system using either a single calibration target (strip) or a dual calibration target (strip) to account for illumination profile and sensor differences during document handler scanning and platen scanning.

BACKGROUND

A document handler, also known as Constant Velocity Transport (CVT) device, draws individual sheets from a stack of sheets and sequentially allows the image on each sheet to be scanned by an optical module. The above differences must be periodically compensated for in order to ensure consistent imaging over time. One common source of long-term performance variation over time can be attributed to platen and CVT scanning, due to illumination intensity changes (depth of illumination) and sensor changes. The process of periodic compensation is referred to as calibration. The position on the calibration strip of the calibration function is important but difficult to determine on the calibration strip, especially for an internal second side scanner. The teachings hereof are directed to scanner calibration using a calibration strip.

BRIEF SUMMARY

What is disclosed is an apparatus and method for optimizing the calibration position when calibrating an optical module of a document scanning device. In one embodiment, the present method involves using imaging sensors of an optical module of a document scanning device to obtain an image scan of a calibration strip (as described herein) on a surface of a platen on which a sheet to be scanned is placed. The calibration strip has a first vertical line at a first distance from a right edge of the strip. The second vertical line has at a second distance from a left edge of the strip. A horizontal line is between the first and second vertical lines. A slope of the horizontal line is non-zero. As disclosed herein further, the image scan of the calibration strip is to calibrate the optical module. Features and advantages of the above-described system and method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is an apparatus and method for optimizing the calibration position when calibrating an optical module of a document scanning device. One of ordinary skill in this art would be readily familiar with various aspects of document scanning devices, as are generally known, including document handlers, scan heads, platens, and the like, including methods for performing calibration of a document scanning device.

An "image", as used herein, refers to a spatial pattern of physical light comprised of known colors of the light spectrum which are visible by the human eye. When reduced to capture or rendering, the image generally comprises a plurality of colored pixels.

A "document sheet" or simply "sheet" refers to an image that has been rendered onto a media substrate such as paper. A sheet can be, for example, a page, a book, a magazine, plots, charts, graphs, photos, and the like. The substrate comprising the sheet may be paper, plastic, fabric, or other image-bearing media.

An "image scan" refers to either a digital representation of a document sheet which has been scanned by the scanner bar, or a hardcopy print of the scanned document sheet.

An "optical module" refers to a portion of the scanning device used to capture and process an image scan of a document sheet. The optical module typically comprises an imaging sensor and an illuminator source mounted on a moveable carriage. Various aspects of the optical module reside in the scanning case, i.e., an area beneath the platen which is traversed by the movable carriage. In various embodiment, the optical module further comprises image processing circuitry, memory, and one or more processors executing machine readable program instructions for performing various aspects of the teachings hereof.

A "scanner bar" also referred to as a "scan head" has an array or equivalent hardware comprising a plurality of imaging sensors that convert reflected light into digital signals. A document scanning device may have more than one scan head. Various aspects of the scan head reside in an area referred to as the scanning case. The scanner bar performs either platen scanning or document handler scanning.

"Platen scanning" refers to a scanning operation wherein the scan head obtains an image scan of a sheet resting on the main platen. In platen scanning, the sheet on the platen remains stationary while the scan head is moved beneath the main platen to capture an image of the face of a document sheet resting thereon. The calibration strip associated with the main platen is called the platen calibration strip.

"Document handler scanning" refers to a scanning operating wherein the scan head obtains an image scan of a sheet which is passing through a scanning window or smaller platen (of adjacent to the main platen). In document handler scanning, the scan head remains stationary while the document handler moves the sheet being scanned along a path of a paper transport or feed mechanisms. The calibration strip associated with the document handler is call the document handler calibration strip.

Figure 1A:
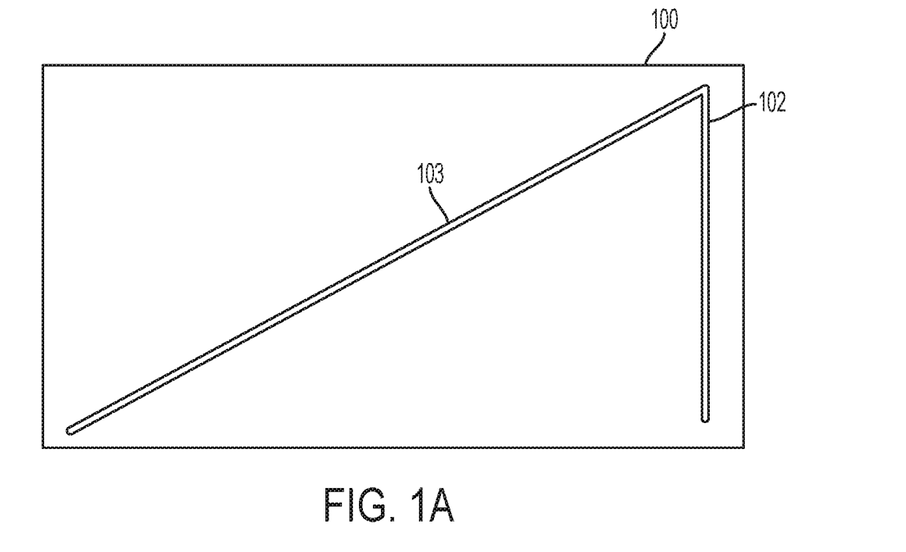
FIGS. 1A and 1B show two embodiments of the calibration strip hereof.
Figure 1B:
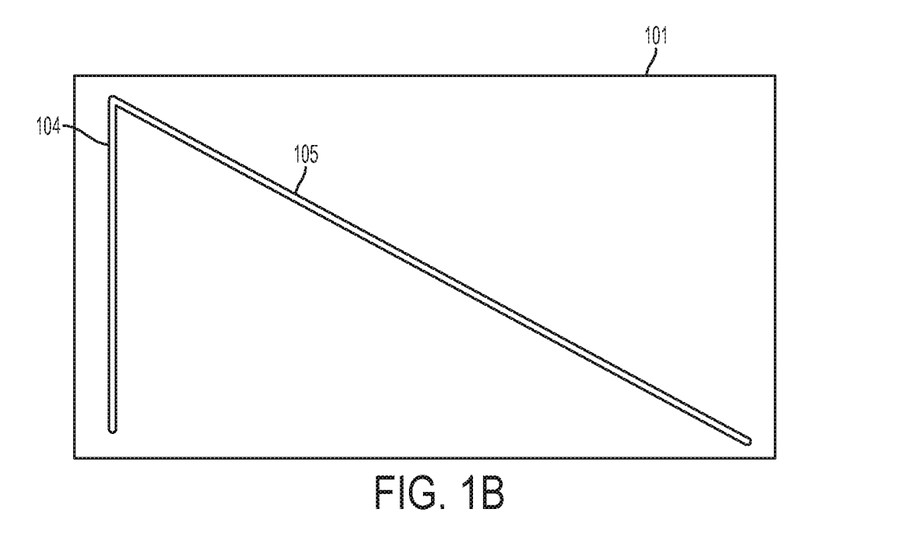

A "calibration strip", in one embodiment, is shown in FIGS. 1A and 1B. In the embodiment of FIG. 1A, the calibration strip 100 has a vertical line 102 near a right edge of the strip, and a sloping horizontal line 103 with a positive slope. In the embodiment of FIG. 1B, the calibration strip 101 has a vertical line 104 near a left edge of the strip, and a sloping horizontal line 105 with a negative slope. The vertical lines and sloping horizontal lines do not have to have the same line width. Further, the sloping horizontal line may not contact the vertical line.

A "document scanning device" or "document scanner" is a device which, in its broadest sense, comprises a scanner bar that optically scans a media and converts the scanned image to a digitized format and a document handler that transports sheets of paper through the scanning device. Common scanning devices include specialized image receptors mounted on a carriage which move beneath a light-transmissive platen and scan a sheet manually placed on top of the platen or scan a sheet being transported by a document handler. An opaque cover is lowered over the sheet on the platen to exclude ambient light. Thereafter, a carriage moves the scan head over to a calibration strip located inside the scanner case, generally defined as an area beneath the platen. The scan head captures an image scan of the calibration strip. The image is analyzed to obtain measurements which, in turn, are used to calibrate the optical module. Once calibrated, the scan head which generally comprises an array of imaging sensors and light sources mounted on a carriage moves to a start of an imaging area and proceeds to move across the pane beneath the platen while imaging sensors detect the light reflected from the face of the document sheet laying on the platen. The sensors of the scan head may be charge-coupled devices (CCDs) or Contact Image Sensors (CISs). CCD-type scanners typically contain three rows of sensors with red, green, and blue filters and a light source for illumination. CIS-type scanners typically consist of a monochromatic photodiode array and red, green, and blue LEDs for illumination. Transparent images placed on the platen may require special accessories that illuminate them from an upper side. Circuitry in the scanning device creates an image of the document sheet.

Example Document Scanning Device

Figure 2:
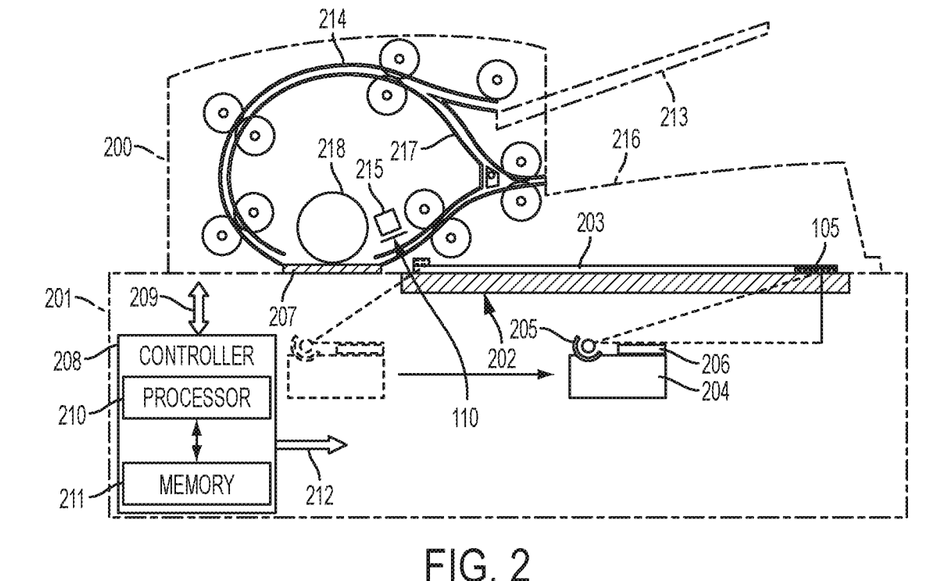
FIG. 2 shows an elevational view of an example document scanning device wherein various aspects of the teachings hereof find their intended uses.
Figure 3:
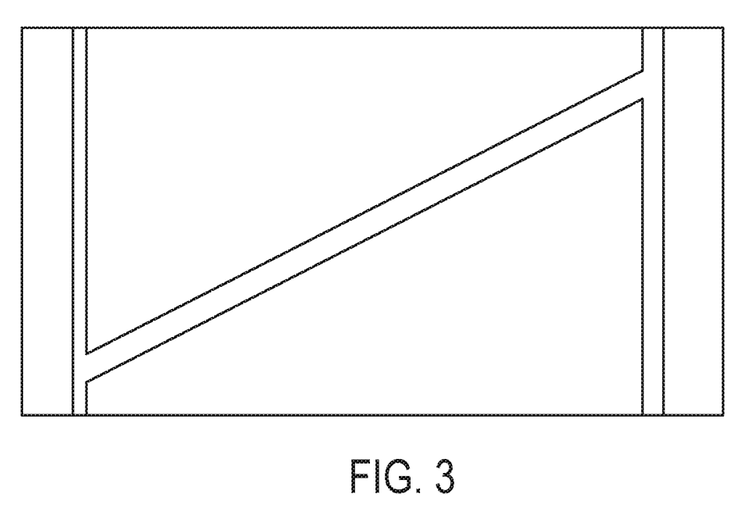
FIGS. 3, 4, 5 and 6 show various embodiments of the calibration strip with differing configurations which fall within the scope of the appended claims.
Figure 4:
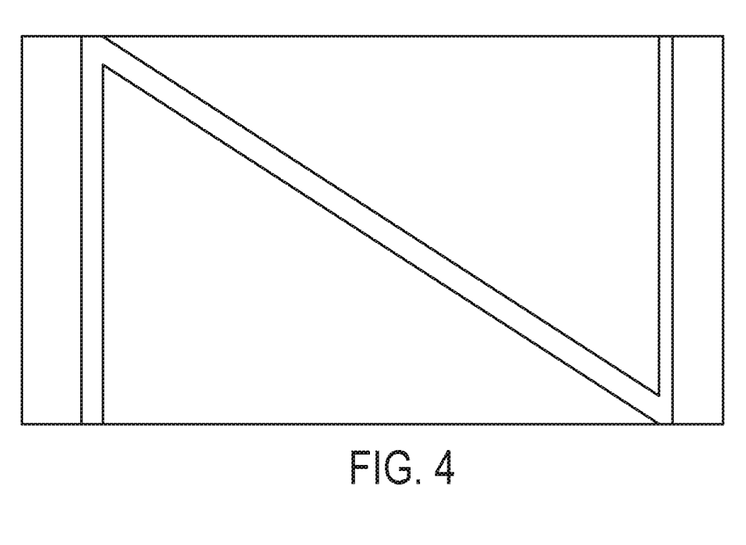
Figure 5:
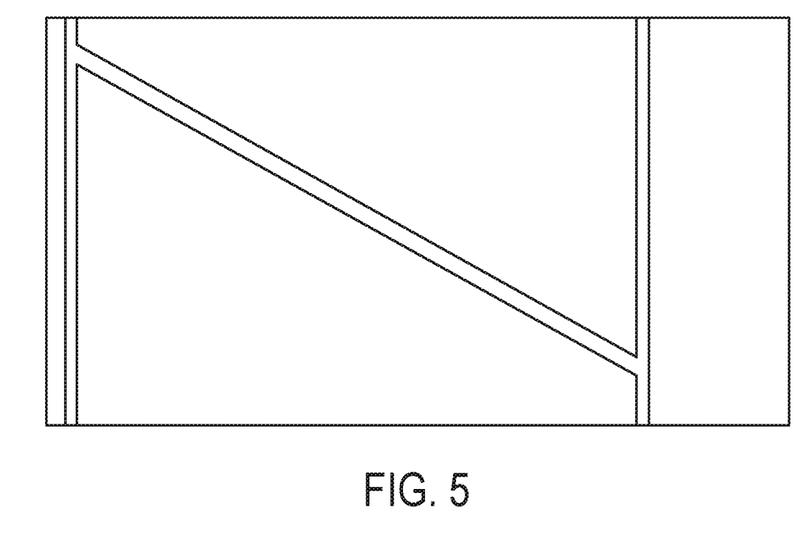
Figure 6:
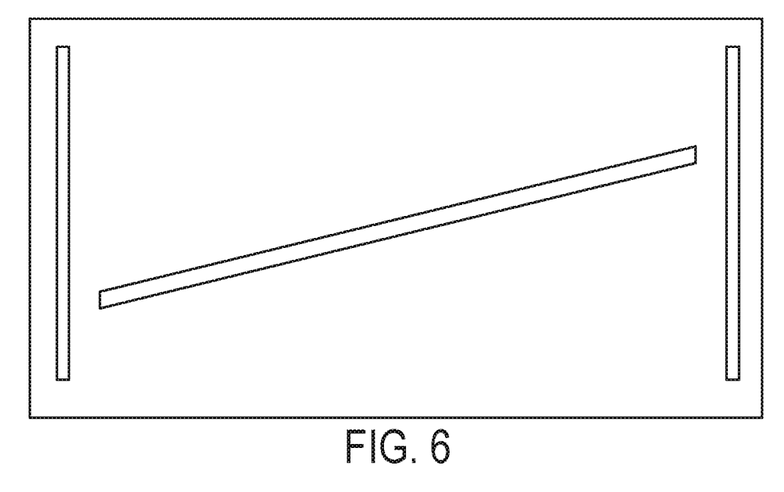

Reference is now being made to FIG. 2 which shows an elevational view of a document handler in combination with a scanner.

The document handler 200 sits atop a main body 201 of the scanner or copier. The document handler is movable relative to the main body, typically by a pivot or hinge-like mechanism (not shown) at the back of the scanner. When the document handler is moved away from the main body, a light-transmissive platen 202 is exposed so a user can place a single sheet thereon to have an image thereof recorded. The platen has a top surface and a bottom surface. When the document handler is in a closed position, a platen backing 203 is in contact with the top surface of the platen and faces downward. Beneath the platen in the scanning area is a scanner bar 204. Mounted on the scanner bar is an illumination source 205 and imaging sensors 206 arranged so that light emitted by illumination source is reflected by the face of the document sheet on top of the platen. The reflected light is recorded by the imaging sensors. The imaging sensors include photosensitive receptors connected to image processing circuitry (not shown) to record and manipulate the image data to obtain an image scan. When a single sheet or other item is desired to be scanned, the scanner bar is caused to move, as shown, relative to the platen to obtain an image scan of that sheet. Alternatively, the imaging sensors 206 are stationary within main body 201 but can selectively record an image on scanning window 207 (a smaller platen) or by the action of an arrangement of one or more movable mirrors or lenses (not shown).

Output analog signals from the imaging sensors are conditioned and converted to digital signals and sent to a controller 208 for further processing or storage. Processor 210 converts the digital signals to output signals 209 and normalizes and further processes the signals as required to enable the device to store and handle the image data in the form required to carry out the scanning task. The processor may also provides enhancements and changes to the signals such as filtering, thresholding, screening, cropping, scaling, and the like, as are desired or as needed. The controller also comprises a memory 211 for storing machine readable program instructions (software), machine operating data, and the scanned image currently being processed, and may further have computer-readable media (not shown) for off-loading the image data. Machine readable program instructions cause the controller, operating alone or in conjunction with the processor 210 to generate signals 212 to control the scanner bar 204, to store and generate calibration values, and to perform other functions know to those in the art.

Sheets placed in tray 213 are drawn one at a time via path 214 by motors (not shown), driving the rollers along the path past the scanner bar and ultimately to output tray 216. If the device is capable of operating in a duplex mode, i.e., sequentially scanning a first one side and then a second side of a sheet, the sheet is effectively inverted and passed through duplexing path 217 for scanning of the second side, or optionally with a second side scanning device 215. In document handler scanning, the scanner bar remains stationary relative to the main body while successive sheets are transported through path 214. When there is no sheet passing through the document handler, the scanner bar sees a backer bar 218 within the document handler. The backer bar may be in the form of a rotatable roll which facilitates transport of a sheet through the document handler. In a practical implementation of a scanner such as is shown in FIG. 2, scanner bar 204, along with its illumination source 205, is used for recording both images on a sheet placed on the platen and a sheet passing through document handler 200 at the scanning window 207.

In this embodiment, there is as first calibration strip 105 (platen calibration strip) and optionally a second calibration strip 110 (document handler calibration strip) for the second side scanning module 215 in a single pass configuration. The first calibration strip is read by scanner bar 204 through the main platen. The scanning device of FIG. 2 can be configured with a single calibration strip and a second calibration strip which is scanned by the second side module.

The calibration strips should be placed in areas of predetermined reflectivity such as on or beneath the main platen or near the backing surface 203, where an image scan of the calibration strips can be obtained by the scanner bar for calibration purposes. FIGS. 3, 4, 5 and 6 show various embodiments of the calibration strip. Measurements obtained from analyzing the image scans of the calibration strips are used to determine if the calibration scan area is optimally placed on the calibration strip, away from the edges to avoid shadowing and moving at a sufficient rate to eliminate calibration strip artefacts during calibration. Calibration has the added benefit of helping to identify malfunctioning photoreceptors. Whilst this method is particularly related to determination of the calibration positions and especially relevant when such strips difficult to access and monitor, for one skilled in the art it should be realized that the methods described are equally valid for position determination in other situations.

Example Calibration

Figure 7A:
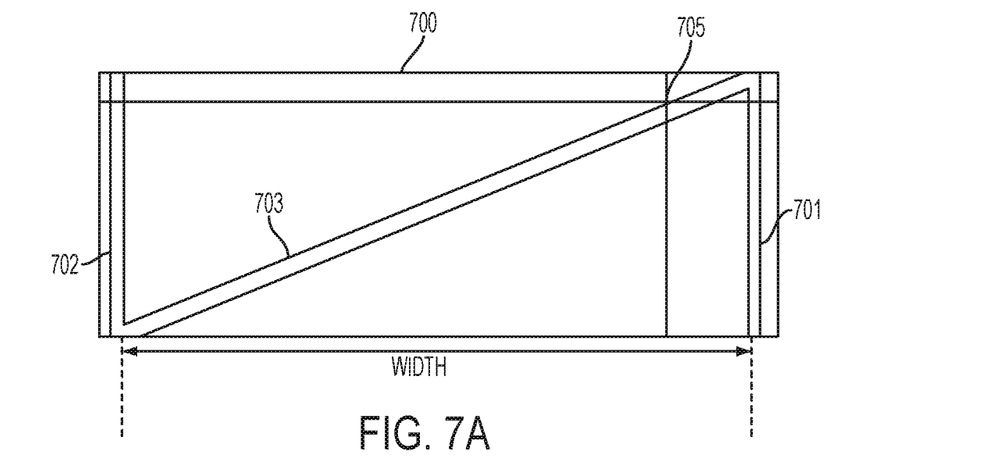
FIG. 7A shows a document handler calibration strip used to determine the imaging point and relative motion of the sensor and image area.
Figure 7B:
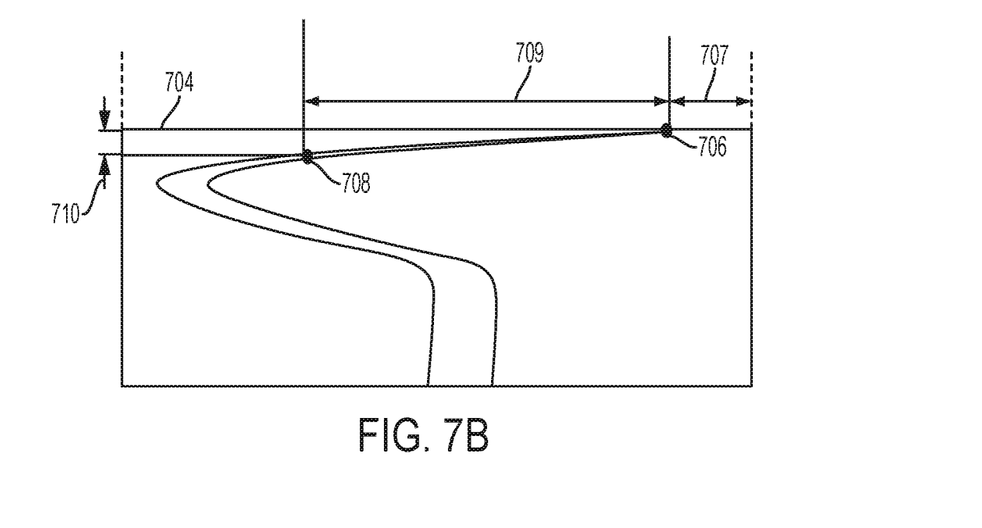
FIG. 7B is an image scan of the calibration strip of FIG. 7A.

Reference is now being made to FIG. 7A which shows a document handler calibration strip 700 having a right vertical line 701, a left vertical line 702, and a sloping horizontal line 703 which has a length of 6000 pixels. The width of the calibration strip 700 is defined as the distance between the vertical lines, i.e., 10 mm. If there is only a single vertical line, as in the embodiments of FIGS. 1A and 1B, then the width is calculated out to the edge of the strip. The line time is 120 µs/line. FIG. 7B shows an image scan 704 of the document handler calibration strip of FIG. 7A. The vertical lines align the image to the sensor and hence the horizontal position of the sloping horizontal line 103 can be translated into distance from the edges of the calibration strip. The imaging point is shown at 705. The start pixel 706 at the imaging point 705 is 850 pixels (at 707) from the right vertical line. The distance from the start pixel (at 706) to the start of forward linear motion (at 708) is 3800 pixels (at 709).

Distance from a Top Edge in mm:

$$\text{Width} \times ((\text{Start Pixel})/\text{Length}) \qquad (1)$$

Figure 8:
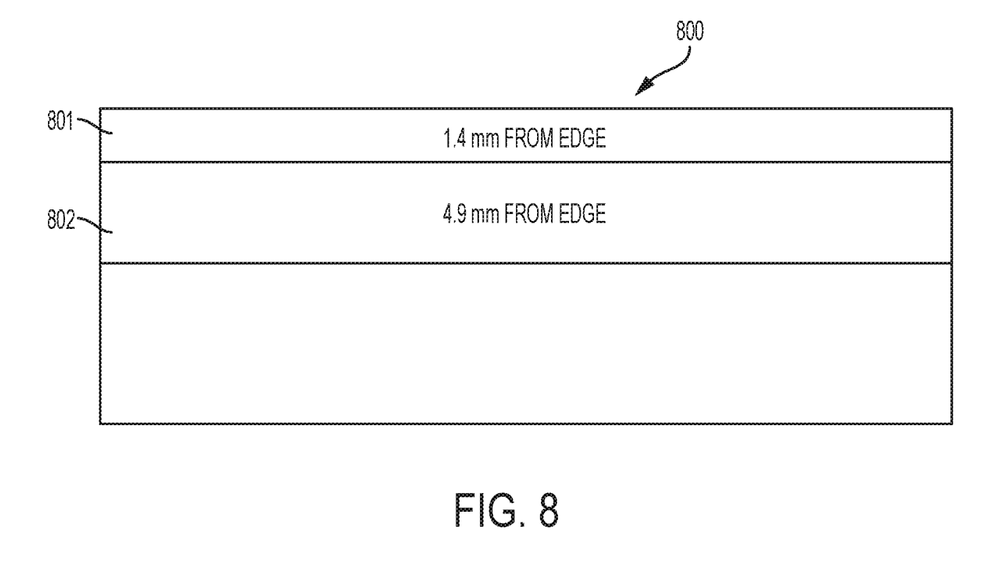
FIG. 8 shows results of the calibration of FIGS. 7A-B.

Assume the following measurements: width=10, length=6000, and the start pixel=850. Using Eq. (1) with these values, we get: 10*(850/6000)=1.4 mm (at 801 from the edge 800 of FIG. 8).

Linear Scanning Area in mm:

$$\text{Width} \times (\text{Linear Motion} - \text{Start Pixel})/\text{Length} \qquad (2)$$

Assume that following measurements: width=10, linear motion=3800, start pixel=850, and length=6000. Using Eq. (2), and plugging in these values, we get: 10*(3800−850)/6000=4.9 mm (at 802 from the edge 800 of FIG. 8).

Number of Scan Lines:
The number of scan lines between the start pixel (at 706) to the point of linear motion 708 is 25 lines (at 710).

Example Flow Diagram

Figure 9:
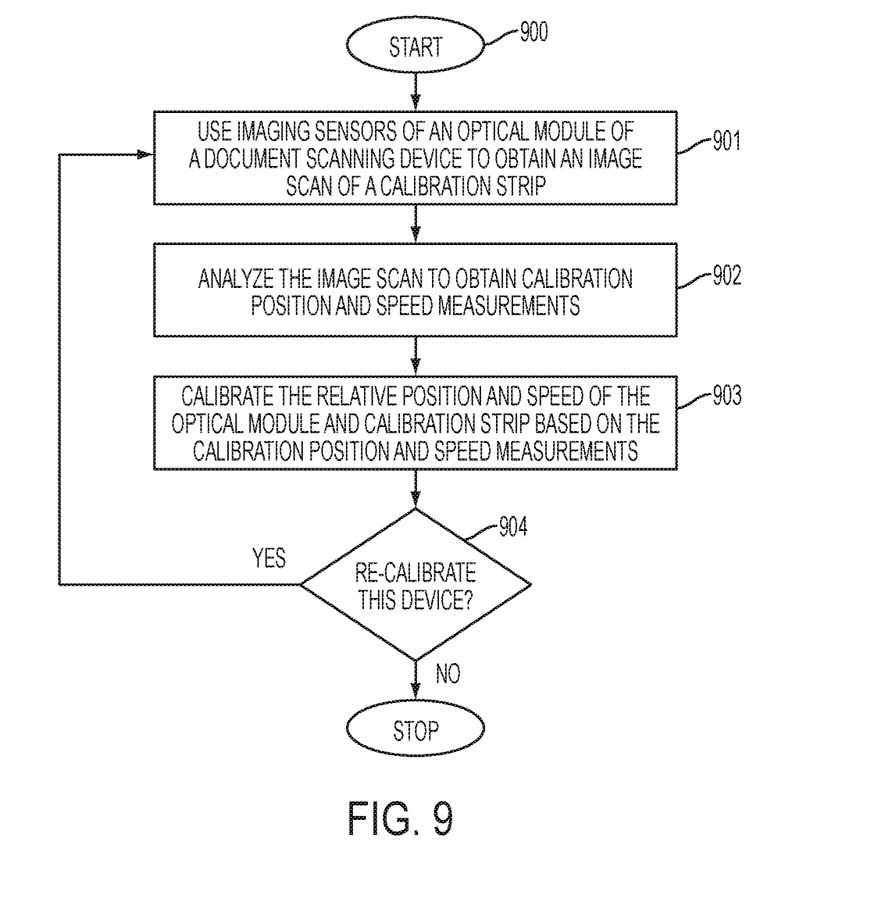
FIG. 9 is a flow diagram of one embodiment of the present method for document scanner calibration using a calibration strip.

Reference is now being made to the flow diagram of FIG. 9 which illustrates one example embodiment of the present method for calibrating an optical module of a document scanning device. Flow processing begins at 900 and immediately proceeds to step 902.

At step 902, use imaging sensors of an optical module of a document scanning device to obtain an image scan of a calibration strip. Embodiments of various calibration strips are shown in FIGS. 1A, 1B, 3, 4, 5, 6 and 7A.

At step 904, analyze the image scan to obtain calibration position and speed measurements.

At step 906, calibrate the relative position and speed of the optical module and calibration strip based on the calibration position and speed measurements.

At step 908, a determination is made whether to re-calibrate this device. If so, then flow processing repeats with respect to step 902 wherein the imaging sensors of an optical module of a document scanning device are used to obtain an image scan of a calibration strip. The image scan of the calibration strip is analyzed to obtain calibration position and speed measurements and the relative position and speed of the optical module and calibration strip is calibrated based on those measures. Thereafter, in this embodiment, further processing stops.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims.

One or more aspects of the teachings herein are intended to be incorporated in an article of manufacture which may be shipped, sold, leased, or otherwise provided separately either alone or as part of a product suite or a service. The above-disclosed and other features, functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims.

What is claimed is:

1. A method for determining a calibration position and speed of an optical module and calibration strip of a document scanning device, the method comprising:
    using a scan head of an optical module of a document scanning device to obtain an image scan of a calibration strip located beneath a platen on which a sheet to be scanned is placed, the calibration strip having at least one of: a right vertical line at a distance from a right edge of the calibration strip, and a left vertical line at a distance from a left edge of the calibration strip, and further having a horizontal line with a non-zero slope;
    determining, from the image scan of the calibration strip to obtain calibration measurements comprising a distance from a top edge, a linear scanning area, and a number of scan lines; and
    using the calibration measurements to adjust the scan head.

2. The method of claim 1, wherein the calibration strip is any of the embodiments shown in FIG. 1A, FIG. 1B, FIG. 3, FIG. 4, FIG. 5, FIG. 6 and FIG. 7A.

3. The method of claim 1, wherein a width of the calibration strip is defined as a distance between the vertical lines, and in response to the calibration strip having only a single vertical line then a width of the calibration strip is a distance from the single vertical line to an edge of the strip.

4. The method of claim 3, wherein the distance from a top edge comprises:

$$\text{Width} \times ((\text{Start Pixel})/\text{Length})$$

where width is the width of the calibration strip in mm, length is the length of the horizontal line in pixels, and start pixel is a distance between the imaging point and the vertical line in pixels.

5. The method of claim 3, wherein the linear scanning area comprises:

$$\text{Width} \times (\text{Linear Motion} - \text{Start Pixel})/\text{Length}$$

where width is the width of the calibration strip in mm, start pixel is a distance between the imaging point and the vertical line in pixels, an amount of linear motion is distance from the start pixel to a start of forward linear motion of the scan head in pixels, and length is a length of the horizontal line in pixels.

6. The method of claim 5, wherein the number of scan lines is a number of lines scanned between the start pixel and a start of a forward linear motion.

7. The method of claim 1, further comprising using the calibration measurements to calibrate a scanning area.

8. A document scanning device, comprising:
- a light-transmissive platen on which a sheet is placed for platen scanning;
- a document handler for transporting a sheet for document handler scanning;
- an optical module having a scan head and an illumination source for obtaining an image scan of a calibration strip located beneath the platen, the calibration strip having at least one of: a right vertical line at a first distance from a right edge of the calibration strip and a left vertical line at a distance from a left edge of the calibration strip, and further having a horizontal line with a non-zero slope; and
- a processor executing machine readable program instructions for performing:
    - receiving an image scan of the calibration strip;
    - determining, from the image scan of the calibration strip to calibration measurements comprising a distance from a top edge, a linear scanning area, and a number of scan lines; and
    - using the calibration measurements to adjust the scan head.

9. The document scanning device of claim 8, wherein the calibration strip is any of the embodiments shown in FIG. 1A, FIG. 1B, FIG. 3, FIG. 4, FIG. 5, FIG. 6 and FIG. 7A.

10. The document scanning device of claim 8, wherein a width of the calibration strip is defined as a distance between the vertical lines, and in response to the calibration strip having only a single vertical line then a width of the calibration strip is a distance from the single vertical line to an edge of the strip.

11. The document scanning device of claim 10, wherein the distance from a top edge comprises:

$$\text{Width} \times ((\text{Start Pixel})/\text{Length})$$

where width is the width of the calibration strip in mm, length is the length of the horizontal line in pixels, and start pixel is a distance between the imaging point and the vertical line in pixels.

12. The document scanning device of claim 10, wherein the linear scanning area comprises:

$$\text{Width} \times (\text{Linear Motion} - \text{Start Pixel})/\text{Length}$$

where width is the width of the calibration strip in mm, start pixel is a distance between the imaging point and the vertical line in pixels, an amount of linear motion is distance from the start pixel to a start of forward linear motion of the scan head in pixels, and length is a length of the horizontal line in pixels.

13. The document scanning device of claim 12, wherein the number of scan lines is a number of lines scanned between the start pixel and a start of the forward linear motion.

14. The document scanning device of claim 8, further comprising using the calibration measurements to calibrate a scanning area.

* * * * *